US011518388B2

(12) United States Patent
Sindhuja et al.

(10) Patent No.: US 11,518,388 B2
(45) Date of Patent: Dec. 6, 2022

(54) METHOD AND SYSTEM FOR DETERMINING LANE CHANGE FEASIBILITY FOR AUTONOMOUS VEHICLES

(71) Applicant: Wipro Limited, Bangalore (IN)

(72) Inventors: A. Sindhuja, Uttar Pradesh (IN); Amrit Paul, Hyderabad (IN); Raghottam Narayan Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 348 days.

(21) Appl. No.: 16/930,548

(22) Filed: Jul. 16, 2020

(65) Prior Publication Data

US 2021/0300371 A1  Sep. 30, 2021

(30) Foreign Application Priority Data

Mar. 31, 2020 (IN) .............................. 202041014161

(51) Int. Cl.
*B60W 30/18* (2012.01)
*G08G 1/16* (2006.01)
*G05D 1/00* (2006.01)

(52) U.S. Cl.
CPC ....... *B60W 30/18163* (2013.01); *G08G 1/166* (2013.01); *B60W 2400/00* (2013.01);
(Continued)

(58) Field of Classification Search
CPC ... B60W 30/18163; B60W 2554/4041; B60W 2554/4042; B60W 2554/4044;
(Continued)

(56) References Cited

U.S. PATENT DOCUMENTS 8,849,494 B1   9/2014 Herbach et al.
9,199,641 B2   12/2015 Ferguson et al.
(Continued)

FOREIGN PATENT DOCUMENTS

CN           105008200 A   10/2015

OTHER PUBLICATIONS

Wan, L., et al., "Lane Change Behavior Modeling for Autonomous Vehicles Based on Surroundings Recognition", International Journal of Automotive Engineering 2 (2011), pp. 7-12.
(Continued)

*Primary Examiner* — Peter D Nolan
*Assistant Examiner* — Tarek Elarabi
(74) *Attorney, Agent, or Firm* — Finnegan, Henderson, Farabow, Garrett & Dunner, LLP

(57) ABSTRACT

A method and system for determining lane change feasibility for autonomous vehicles is disclosed. The method includes the steps of tracking, in each frame, at least one neighboring vehicle from a plurality of neighboring vehicles in a current lane being used by the AV and in a plurality of adjacent lanes. The method further includes determining, in each frame, a set of kinematic parameters associated with each of the at least one neighboring vehicle, and assigning an occupancy state from a plurality of occupancy states to each of a plurality of voxels capturing a spatial information for each of the plurality of neighboring vehicles. The method may further includes determining an effective occupancy probability for each of the plurality of adjacent lanes, and determining feasibility of lane change for the AV to at least one adjacent lane from the plurality of adjacent lanes.

18 Claims, 11 Drawing Sheets

(52) U.S. Cl.
CPC . *B60W 2420/52* (2013.01); *B60W 2554/4041* (2020.02); *B60W 2554/4042* (2020.02); *B60W 2554/4044* (2020.02); *G05D 1/0088* (2013.01); *G05D 2201/0213* (2013.01)

(58) Field of Classification Search
CPC .......... B60W 2400/00; B60W 2420/52; G08G 1/166; G05D 1/0088; G05D 2201/0213
See application file for complete search history.

(56) References Cited

U.S. PATENT DOCUMENTS

| | | | |
|---|---|---|---|
| 9,669,872 | B2 | 6/2017 | Rebhan et al. |
| 10,553,117 | B1 * | 2/2020 | Johnson ............ B60W 30/0956 |
| 2010/0121577 | A1 | 5/2010 | Zhang et al. |
| 2017/0021864 | A1 * | 1/2017 | Sonntag ............ B60W 30/0956 |
| 2017/0232970 | A1 * | 8/2017 | Schaper ................ G08G 1/167 |
| | | | 701/36 |
| 2018/0251155 | A1 | 9/2018 | Chan |
| 2019/0135290 | A1 | 5/2019 | Marden et al. |
| 2019/0329777 | A1 * | 10/2019 | Rajab .................... G08G 1/167 |
| 2019/0384304 | A1 | 12/2019 | Towal et al. |

OTHER PUBLICATIONS

Q. Li, et al., "A Sensor-Fusion Drivable-Region and Lane-Detection System for Autonomous Vehicle Navigation in Challenging Road Scenarios," IEEE Transactions on Vehicular Technology, vol. 63, No. 2, pp. 540-555, Feb. 2014 (15 pages).

* cited by examiner

METHOD AND SYSTEM FOR DETERMINING LANE CHANGE FEASIBILITY FOR AUTONOMOUS VEHICLES

TECHNICAL FIELD

The present invention relates to autonomous vehicles. In particular, the present invention relates to a method and system for determining lane change feasibility for autonomous vehicles.

BACKGROUND

Nowadays, autonomous driving technology is developing rapidly. Autonomous Vehicles (AVs) or Self Driving Vehicles (SDVs) require improvement in some aspects such as lane change due to speed limitations, free space occupancy detection, localization of AVs, trajectory plan generation for overtaking, obstacles detection, and the like. In case of lane change, by the AVs, accurate parameters should be extracted in a definite time that must be required for moving an autonomous vehicle (AV) to one of adjacent lanes. Furthermore, detecting free space in the adjacent lanes is a challenging problem.

Some conventional techniques may use high definition images, such as RGB images or Infra-Red (IR) images, by employing some cameras or combination of various vision/perception sensors. By using these images, nearby environmental information with respect to the AV, for example, an obstacle, speed of neighboring vehicles, and position of the neighboring vehicles, may be identified. Also, for precision, these techniques require high definition devices to capture high definition images. Additionally, it is difficult during nights or in absence of light to fetch the environmental information using the RGB and IP images, due to insufficient availability of gradient and depth information. These techniques are only suitable for straight roads and do not provide effective results, when used for curvy roads.

There is therefore a need to develop a system or method that may determine lane change feasibility accurately and quickly, irrespective of light and road conditions, while using minimal sensors and computations.

SUMMARY

In one embodiment, a method for determining lane change feasibility for an Autonomous Vehicle (AV) is disclosed. In one embodiment, the method may include tracking in each frame at least one neighboring vehicle from a plurality of neighboring vehicles in a current lane being used by the AV and in a plurality of adjacent lanes based on a neural network. It should be noted that the AV may be considered as a reference point to track the at least one neighboring vehicle. The method may further include determining in each frame a set of kinematic parameters associated with each of the at least one neighboring vehicle, based on information captured in response to the tracking. The method may further include assigning an occupancy state from a plurality of occupancy states to each of a plurality of voxels capturing a spatial information for each of the plurality of neighboring vehicles moving on one of the plurality of adjacent lanes and the current lane, based on the spatial information and dimensions of the AV. The method may further include determining an effective occupancy probability for each of the plurality of adjacent lanes, based on an occupancy state assigned to each voxel in an associated set of voxels from the plurality of voxels, weights associated with each of the plurality of occupancy states, and a plurality of overlap factors. The method may further include determining, by the occupancy detection device, feasibility of lane change for the AV to at least one adjacent lane from the plurality of adjacent lanes based on comparison of the effective occupancy probability determined for each of the plurality of adjacent lanes with a predefined probability threshold.

In another embodiment, a system for determining lane change feasibility for an Autonomous Vehicle (AV) is disclosed. The system includes a processor and a memory communicatively coupled to the processor, wherein the memory stores processor instructions, which, on execution, causes the processor to track at least one neighboring vehicle from a plurality of neighboring vehicles in a current lane being used by the AV and in a plurality of adjacent lanes, in each frame, based on a neural network. It should be noted that the AV may be considered as a reference point to track the at least one neighboring vehicle. The processor instructions further cause the processor to determine in each frame a set of kinematic parameters associated with each of the at least one neighboring vehicle, based on information captured in response to the tracking. The processor instructions further cause the processor to assign an occupancy state from a plurality of occupancy states to each of a plurality of voxels capturing a spatial information for each of the plurality of neighboring vehicles moving on one of the plurality of adjacent lanes and the current lane, based on the spatial information and dimensions of the AV. The processor instructions further cause the processor to determine an effective occupancy probability for each of the plurality of adjacent lanes, based on an occupancy state assigned to each voxel in an associated set of voxels from the plurality of voxels, weights associated with each of the plurality of occupancy states, and a plurality of overlap factors. The processor instructions further cause the processor to determine feasibility of lane change for the AV to at least one adjacent lane from the plurality of adjacent lanes based on comparison of the effective occupancy probability determined for each of the plurality of adjacent lanes with a predefined probability threshold.

In yet another embodiment, a non-transitory computer-readable medium storing computer-executable instruction for determining lane change feasibility for an Autonomous Vehicle (AV) is disclosed. In one example, the stored instructions, when executed by a processor, may cause the processor to perform operations including tracking in each frame at least one neighboring vehicle from a plurality of neighboring vehicles in a current lane being used by the AV and in a plurality of adjacent lanes based on a neural network. It should be noted that the AV may be considered as a reference point to track the at least one neighboring vehicle. The operations may further include determining in each frame a set of kinematic parameters associated with each of the at least one neighboring vehicle, based on information captured in response to the tracking. The operations may further include assigning an occupancy state from a plurality of occupancy states to each of a plurality of voxels capturing a spatial information for each of the plurality of neighboring vehicles moving on one of the plurality of adjacent lanes and the current lane, based on the spatial information and dimensions of the AV. The operations may further include determining an effective occupancy probability for each of the plurality of adjacent lanes, based on an occupancy state assigned to each voxel in an associated set of voxels from the plurality of voxels, weights associated with each of the plurality of occupancy states, and a plurality of overlap factors. The operations may further include determining of lane change for the AV to at least one adjacent lane from the plurality of adjacent lanes based on comparison of the effective occupancy probability determined for each of the plurality of adjacent lanes with a predefined probability threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
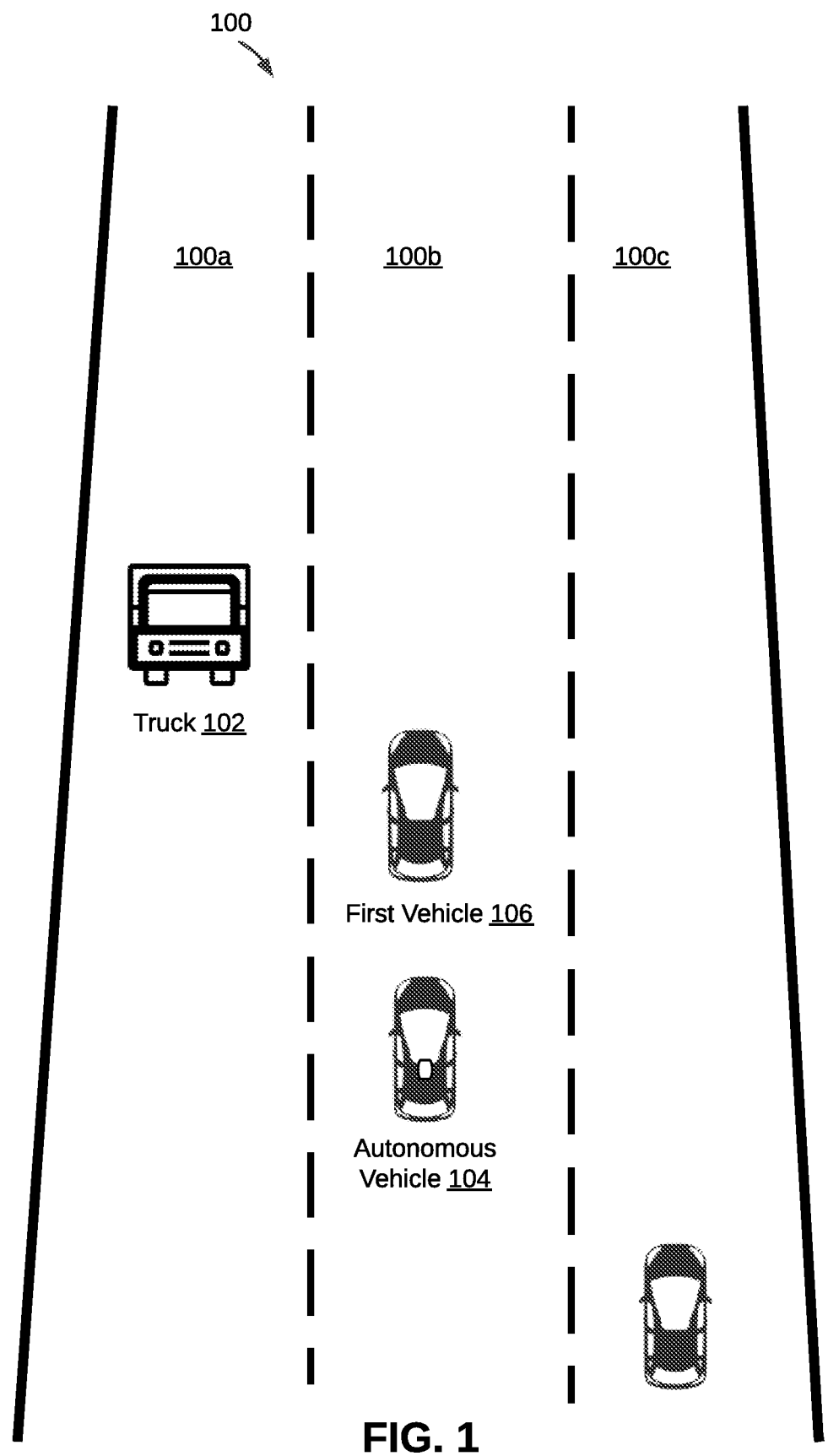
FIG. 1 illustrates an exemplary environment in which various embodiments may be employed.

An exemplary environment 100 in which various embodiments may be employed, is illustrated in FIG. 1. The environment 100 depicts a section of a highway that includes three lanes, i.e., a lane 100a, a lane 100b, a lane 100c. Each of the lanes 100a-100c may have an associated speed limit for different type vehicles moving on the highway. The environment 100 may further include a truck 102 moving in the lane 100a (i.e., the leftmost lane) at a slow speed and an Autonomous Vehicle (AV) 104 (also referred to as an autonomous ground vehicle (AGV)) moving behind a first vehicle 106 (front vehicle), in the lane 100b (i.e., the central lane). In an exemplary scenario, the AV 104 and the first vehicle 106 may be moving at a certain speed that conforms with permissible speed limit for the lane 100b. Additionally, the AV 104 may want to change its speed which satisfies speed limit of the lane 100a. In that case, the AV 104 should move from the lane 100b to 100a, following rules and regulations. Thus, rather than changing its speed in the central lane (i.e. current lane of the AV 104), the AV 104 may try to find an opportunity for switching to the lane 100a from 100b. To change the lane, the AV 104 may determine free space occupancy in the lane 100a, considering some parameters such as relative speed, relative position, and relative distance of the truck 102, first vehicle 106, and other neighboring vehicles with respect to the AV 104. Subsequently, the AV 104 moves to the lane 100a when the lane change is feasible. In another exemplary scenario, consider a situation that the first vehicle 106 may be moving at a speed that is lower than that of the AV 104. Instead of moving into one of the adjacent lanes, i.e., the lanes 100a and 100c, the AV 104 may want to overtake the first vehicle 106 via one of the lanes 100a and 100c and then come back to the lane 100b for further motion. In such a situation, the AV 104 may try to find an opportunity for overtaking the first vehicle 106. To this end, the AV 104 may temporarily occupy a vacant highway portion available on either of the adjacent lanes, i.e., lanes 100a and 100c, and may again come back to the lane 100b, i.e., the central lane. It will be apparent to a person skilled in the art that the above scenarios are merely exemplary and various other scenarios may necessitate such overtaking maneuvers by the AV 104.

Figure 2:
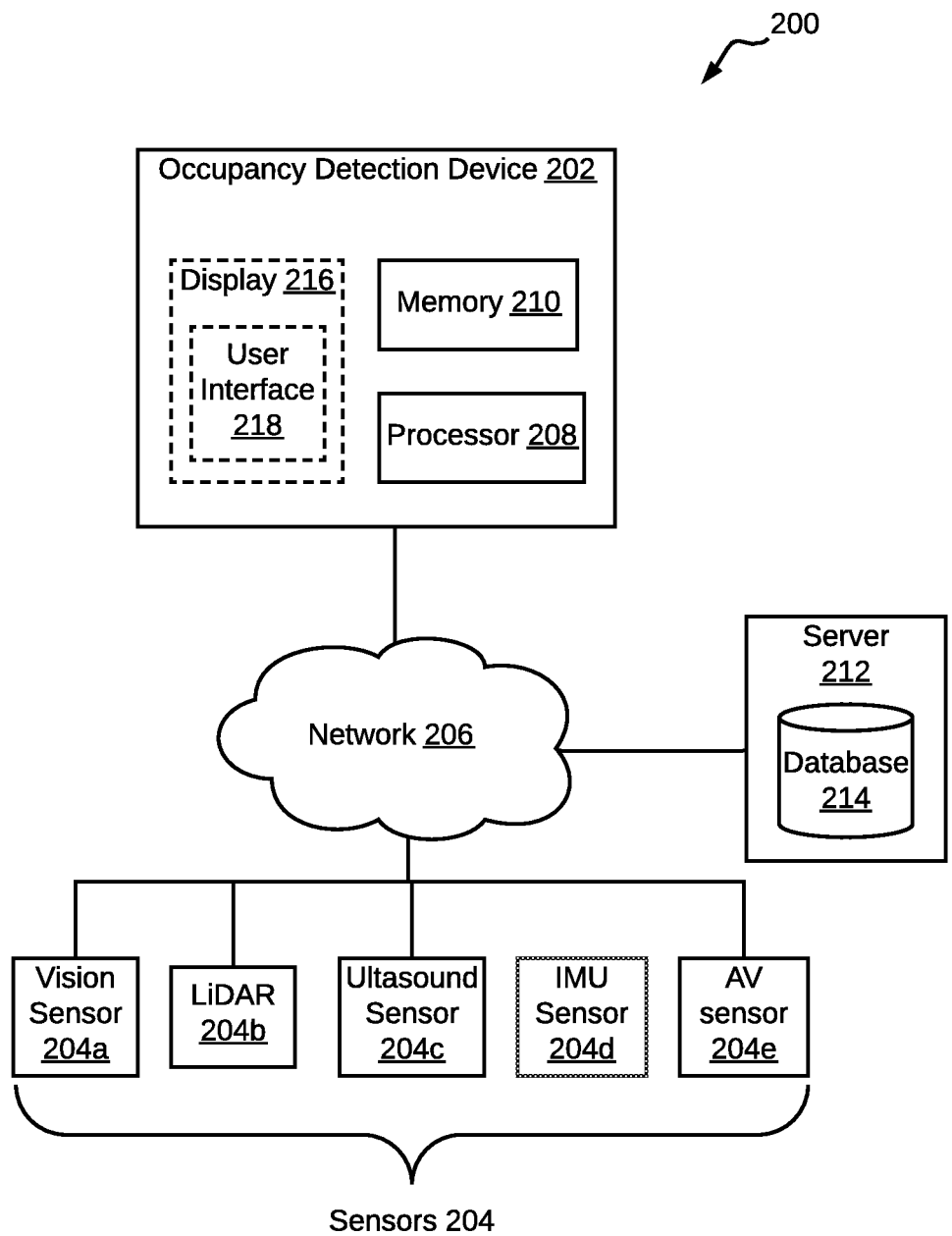
FIG. 2 is a block diagram illustrating a system for determining lane change feasibility for an autonomous vehicle, in accordance with an embodiment.

Referring now to FIG. 2, a system 200 for determining lane change feasibility for the AV 104 is illustrated, in accordance with an embodiment. The system 200 may include an occupancy detection device 202 that has processing capabilities to determine lane change feasibility for the AV 104. The occupancy detection device 202 may be integrated within the AV 104 or may be located remotely from the AV 104. Examples of the occupancy detection device 202 may include, but are not limited to a car dashboard, an application server, a desktop, a laptop, a notebook, a netbook, a tablet, a smartphone, or a mobile phone.

The occupancy detection device 202 may determine lane change feasibility for the AV 104 by comparing effective occupancy probabilities determined for a plurality of adjacent lanes (for example, the lanes 100a, and 100c). In order to change the lane, the occupancy detection device 202 may continuously monitor the current lane (for example, lane 100b), each of the plurality of adjacent lanes (for example, lanes 100a and 100c), and neighboring vehicles in proximity to the AV 104. The occupancy detection device 202 may receive a point cloud data that includes an environmental information of a plurality of objects (for example an obstacle, pedestrians, animals, construction boards, barricades and a vehicle) from one of a plurality of sensors 204 placed at various locations within the AV 104. By way of an example, the plurality of sensors 204 may include, but are not limited to, a vision sensor 204a, an AV sensor 204b, an ultrasound sensor 204c, an Inertial Measurement Unit (IMU) sensor 204d, and a Light Detection and Ranging (LiDAR) sensor 204e. One of the plurality of sensors 204 providing the point cloud data may be the LiDAR sensor 204e.

Additionally, the occupancy detection device 202 may receive localization information associated with the truck 102, the first vehicle 106 and other neighboring vehicles from the plurality of sensors 204. The plurality of sensors 204 may be communicatively coupled to the occupancy detection device 202, via a network 206. The network 206 may be a wired or a wireless network and the examples may include, but are not limited to the Internet, Wireless Local Area Network (WLAN), Wireless Fidelity (Wi-Fi), Long Term Evolution (LTE), Worldwide Interoperability for Microwave Access (WiMAX), Fifth Generation (5G) network, and General Packet Radio Service (GPRS).

As will be described in greater detail in conjunction with FIG. 3 to FIG. 11, in order to determine lane change feasibility for the AV 104, the occupancy detection device 202 may include a processor 208, which may be communicatively coupled to a memory 210. The memory 210 may store process instructions, which when executed by the processor 208 may cause the processor 208 to determine lane change feasibility for the Av 104. This is further explained in detail in conjunction with FIG. 3. The memory 210 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM).

In an embodiment, the occupancy detection 202 may extract a set of control parameters from a server 212, via the network 206, in order to identify free space to move the AV 104 in one of the plurality of adjacent lanes (for example, lanes 100a and 100c). It will be apparent to a person skilled in the art that the server 212 may be remotely located, such that, the server 212 may be accessed by multiple autonomous vehicles at any given time. In one implementation, the server 212 may be located within the AV 104. The server 212 may include a database 214 that may be updated periodically with a new set of control parameters generated for controlling movement of the AV 104.

The occupancy detection device 202 may further include a display 216 that may further include a user interface 218. A user or an administrator may interact with the occupancy detection device 202 and vice versa through the display 216. The display 216 may be used to display various results (intermediate or final) that may be used while performing lane change maneuver by the AV 104. The user interface 218 may be used by the user to provide inputs to the occupancy detection device 202.

Figure 3:
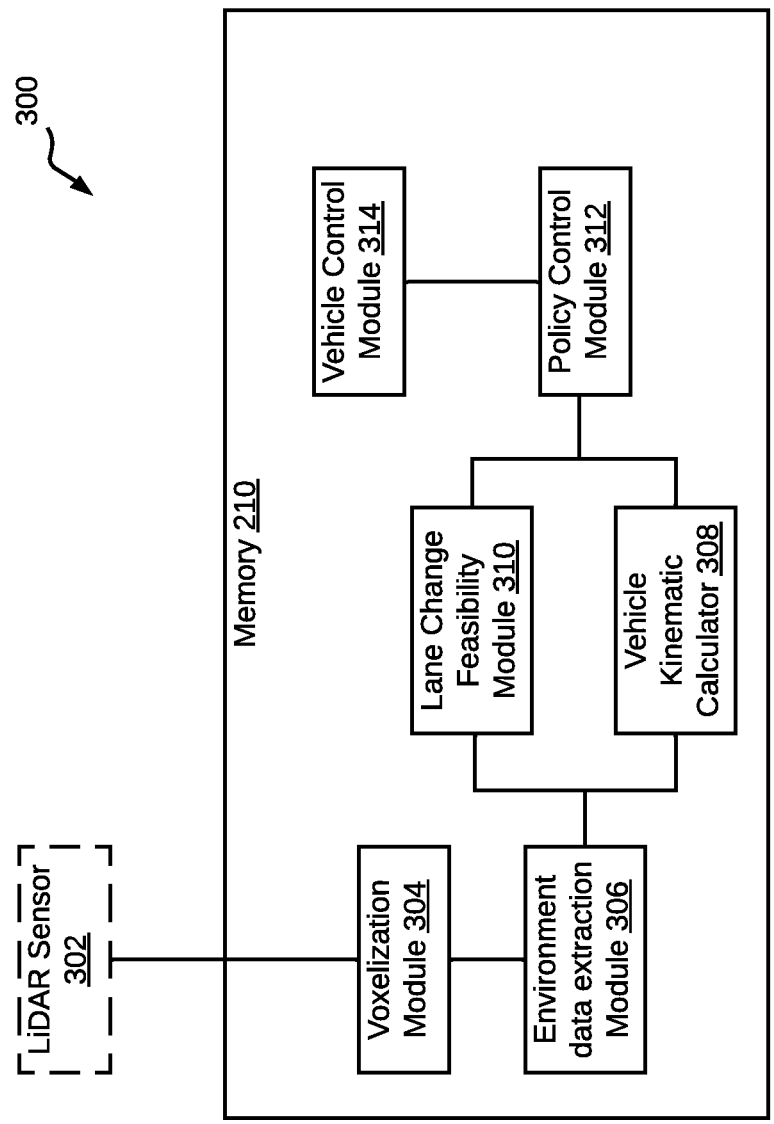
FIG. 3 is a functional block diagram of various modules within a memory of an occupancy detection device configured to determine lane change feasibility for an autonomous vehicle, in accordance with an embodiment.

Referring now to FIG. 3, a block diagram of various modules within the memory 210 of the occupancy detection device 202 configured to determine lane change feasibility for the AV 104 is illustrated, in accordance with an embodiment. The memory 210 may include various modules 304-312 for performing multiple operations to detect lane change feasibility for the AV 104 with high accuracy, irrespective of day/night conditions and road conditions (for example, curves) in addition to less computations. Further, the memory 210 may be communicatively connected to a LiDAR sensor 302 (from the plurality of sensors 204). The modules within the memory 210 of the occupancy detection device 202 may include a voxelization module 304, an environment data extraction module 306, a vehicle kinematic calculator 308, a lane change feasibility module 310, a policy control module 312, and a vehicle control module 314.

The LiDAR sensor 302 may be mounted on the AV 104, enabling the LiDAR 302 to capture a fine three-dimensional (3D) view of surroundings of the AV 104. It will be apparent to a person skilled in the art that the LiDAR 302 may be placed anywhere inside or outside the AV 104. Further, the LiDAR sensor 302 may be configured to capture environmental information of different objects with respect to the AV 104. The environmental information may correspond to a point cloud data. The LiDAR sensor 302 may transfer the point cloud data that includes environmental information to the memory 210.

The memory 210 may receive the point cloud data from the LiDAR sensor 302 and may transmit the point cloud data to the voxelization module 304. After receiving the point cloud data, the voxelization module 304 may convert the point cloud data into a plurality of voxels. In other words, the point cloud data may be disintegrated into a plurality of 3D volumetric grids. Also, it may be noted that each of the 3D volumetric grids may include a sparse point cloud data. Further, the voxelization module 304 may be operatively coupled to the environment data extraction module 306 for performing further processing.

The environment data extraction module 306 may be configured to receive the plurality of voxels. By combining one or more of the plurality of voxels, the environment data extraction module 306, may differentiate obstacles and vehicles in proximity of the AV 104, from the plurality of objects. To differentiate obstacle and a plurality of neighboring vehicles, the environment data extraction module 306 may use an object detection technique. The object detection technique may include at least one of, but is not limited to, a Region-based Convolutional Neural Network (R-CNN), a Fast R-CNN, or a Faster R-CNN. An output generated by the environment data extraction module 306 may include localization information of the plurality of neighboring vehicles as well as classification of the obstacles present in proximity to the AV 104. The localization information may include vehicle speed, direction of motion of a vehicle, and a vehicle position. Further, the environment data extraction module 306 may be communicatively interlinked to the lane change feasibility module 310 and the vehicle kinematic calculator 308.

The vehicle kinematic calculator 308 may be configured to receive the output generated by the environment data extraction module 306. Once the plurality of neighboring vehicles is detected by the environment data extraction module 306, the vehicle kinematic calculator 308 may determine a set of kinematic parameters associated with each of the plurality of neighboring vehicle. In some embodiments, the localization information associated with each of the plurality of neighboring vehicle may be utilized to determine the set of kinematic parameters. The set of kinematic parameters may include, but is not limited to a relative speed with respect to the AV 104, a relative position with respect to the AV 104, a relative distance with respect to the AV 104, and a relative direction of motion with respect to the AV 104. Furthermore, the vehicle kinematic calculator 308 may be communicatively coupled to the lane change feasibility module 310 and the policy control module 312.

The lane change feasibility module 310 may receive the output generated by the environment data extraction module 306. In some embodiments, the lane change feasibility module 310 may assign an occupancy state to each of the plurality of voxels capturing a spatial information for each of the plurality of neighboring vehicles. The occupancy state may include an occupied state, an unoccupied state, and an unknown state. Based on the assigned occupancy states, an effective probability of occupancy for each of the adjacent lanes may be evaluated. This is further explained in detail in conjunction with FIG. 4 to FIG. 8. Further, the lane change feasibility module 310 may be coupled to the policy control module 312, which may use the evaluated probability of occupancy to establish control policies. This is further explained in detail in conjunction with FIG. 9.

The policy control module 312 may receive effective probability of occupancy from the lane change feasibility module 310. Also, the set of kinematic parameters from the vehicle kinematic calculator 308 may be fed to the policy control module 312. Here, complex scenarios such as state handling and unknown vehicle handling may be controlled by the policy control module 312. Further, the policy control module 312 may make a decision of lane change for the AV 104 based on the set of kinematic parameters and the effective probability of occupancy, i.e., whether the lane change is feasible or not. One of a plurality of feasibility categories may be assigned to each of the plurality of neighboring lanes based on a current speed of the AV 104, by the policy control module 312. The plurality of feasibility categories may include a first feasibility category, where lane change is feasible without changing the current speed of the AV 104, a second feasibility category, where lane change is feasible by decreasing the current speed of the AV 104, a third feasibility category, where lane change is feasible by increasing the current speed of the AV 104. Further, a priority may be assigned to each of the plurality of feasibility categories. By way of an example, highest priority may be assigned to the first feasibility category and the lowest priority is assigned to the second feasibility category.

Accordingly, a signal for the assigned priority may be transmitted to the vehicle control module 314. Thereafter, the vehicle control module 314 may select a lane and may plan an appropriate track for performing a lane change maneuver that must be followed by the AV 104. It should be noted that the vehicle control module 314 may select the lane and may plan the track based on priority assigned to the each of the feasibility categories.

In short, the occupancy detection device 202 may use a point cloud data received from a LiDAR sensor installed on the AV 104 or the available static maps of navigation of the AV 104. The captured point cloud data is then converted into voxel grids (i.e., occupancy grids). Now, agglomeration of these voxel grids may be used to detect obstacles. After detecting the presence of the obstacles on a road, other required parameters such as the direction of the movement of obstacles, their relative position and relative velocity with respect to the AV 104 may be calculated. Based on the calculated parameters, a distance between the AV 104 and neighboring vehicles is calculated. Then, the probability of occupancy for adjacent lanes may be determined. Based on the calculated probability of occupancy, control policies for lane change feasibility may be established that may be further transmitted to the vehicle control module 314 for planning lane change maneuver, such as, acceleration, deceleration, lane change, continue on present lane, and determination of steering values.

Figure 4:
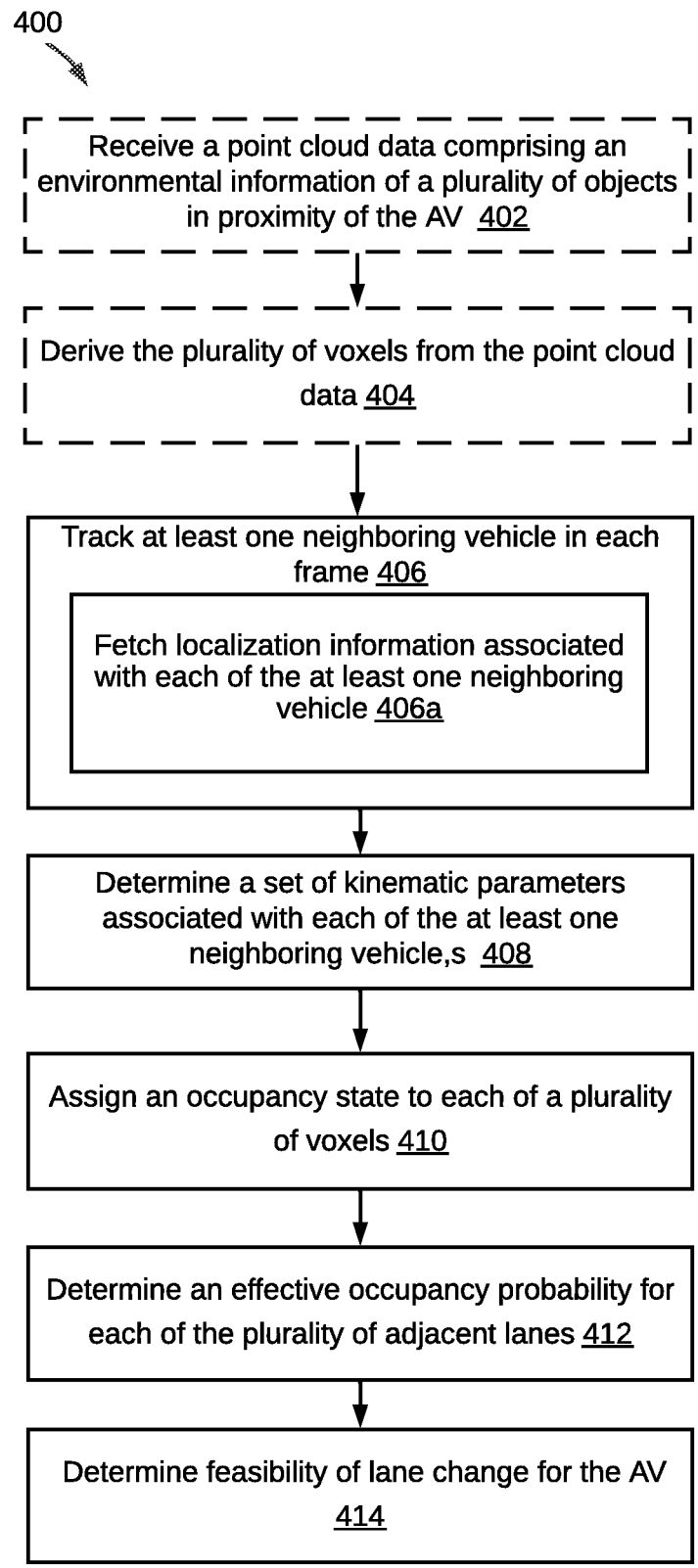
FIG. 4 is a flowchart of a method for determining lane change feasibility of an autonomous vehicle, in accordance with an embodiment.

Referring now to FIG. 4, a flowchart 400 of a method for determining lane change feasibility of an autonomous vehicle is illustrated, in accordance with an embodiment. All the steps of the flowchart 400 may be performed by the occupancy detection device 202. At step 402, a point cloud data may be received. It may be noted that the point cloud data may include an environmental information of a plurality of objects in proximity of the AV 104. The LiDAR sensor 302 may be used to collect the point cloud data from surroundings of the AV 104. The plurality of objects may include, but are not limited to an obstacle, pedestrians, animals, construction boards, barricades, and a plurality of neighboring vehicles. Thereafter, at step 404, a plurality of voxels may be derived from the point cloud data. The point cloud may also be used to derive the plurality of voxels for each frame captured from the point cloud data. A voxel is an element of a space with predefined and quantized dimensions. One or more of the plurality of voxels are 3D volumetric cells which in combination represent a 3D space or a 3D bounding box. In some embodiments, the plurality of voxels may be used to determine objects in proximity to the AV 104. Additionally, in some embodiments, a voxel grid based localization and classification may be performed for the object detection present in the environment around the AV 104. An object enclosed in a 3D bounding box may represent an individual object.

At step 406, at least one neighboring vehicle from the plurality of neighboring vehicles may be tracked in each frame. The tracking may be performed for a current lane where the AV 104 is moving and in a plurality of adjacent lanes associated with the AV 104. A neural network may be employed to accurately track the plurality of neighboring vehicles. To track the at least one neighboring vehicle, the AV 104 may be considered as a reference point. In some embodiments, localization information associated with each of the at least one neighboring vehicle may be used for tracking. The localization information of a neighboring vehicle may include, but is not limited to a vehicle speed, direction of motion of a vehicle, and a vehicle position.

At step 408, a set of kinematic parameters associated with each of the at least one neighboring vehicle may be determined in each frame. In other words, a separate set of kinematic parameters may be determined for each of the at least one neighboring vehicle. The information captured in response to the tracking the at least one neighboring vehicle may be utilized to determine the set of kinematic parameters. The set of kinematic parameters may include, but are not limited to a relative speed with respect to the AV 104, a relative position with respect to the AV 104, a relative distance with respect to the AV 104, and a relative direction of motion with respect to the AV 104.

At step 410, an occupancy state from a plurality of occupancy states may be assigned to each of a plurality of voxels. The plurality of voxels may capture a spatial information for each of the plurality of neighboring vehicles moving on one of the pluralities of adjacent lanes or the current lane. The spatial information and dimensions of the AV 104 may be used to assign the occupancy states. The plurality of occupancy states may include, but are not limited to an occupied state, an unoccupied state, and an unknown state. An occupied state assigned to a voxel may indicate that the voxel is occupied, an unoccupied state assigned to a voxel may indicate that the voxel is unoccupied, and an unknown state assigned to a voxel may indicate that the probability of occupancy or unoccupancy of the voxel is 50%. In an embodiment, each of the occupied state, the unoccupied state, and the unknown state are associated with weights. It should be noted that a highest weight may be associated with the occupied state and a lowest weight may be associated with the unoccupied state. This is further explained in detail in conjunction with FIGS. 5A and 5B.

At step 412, an effective occupancy probability may be determined for each of the plurality of adjacent lanes. The effective probability of occupancy for an adjacent lane may be determined based on an occupancy state assigned to each voxel in a set of voxels associated with the adjacent lane, weights associated with each of the plurality of occupancy states, and a plurality of overlap factors. The plurality of overlap factors are further explained in detail in conjunction with FIG. 5A and FIG. 5B.

At step 414, feasibility of lane change for the AV 104 to at least one adjacent lane from the plurality of adjacent lanes may be determined. In some embodiments, the effective occupancy probability associated with each the plurality of adjacent lanes may be compared with a predefined probability threshold. Thereafter, it may be determined that the effective occupancy probability determined for each of the at least one adjacent lane is greater than the predefined probability threshold. Thus, each of the at least one adjacent lane may further be evaluated to determine the feasibility of lane change for the AV 104 to one of the at least one adjacent lane.

Figure 5A:
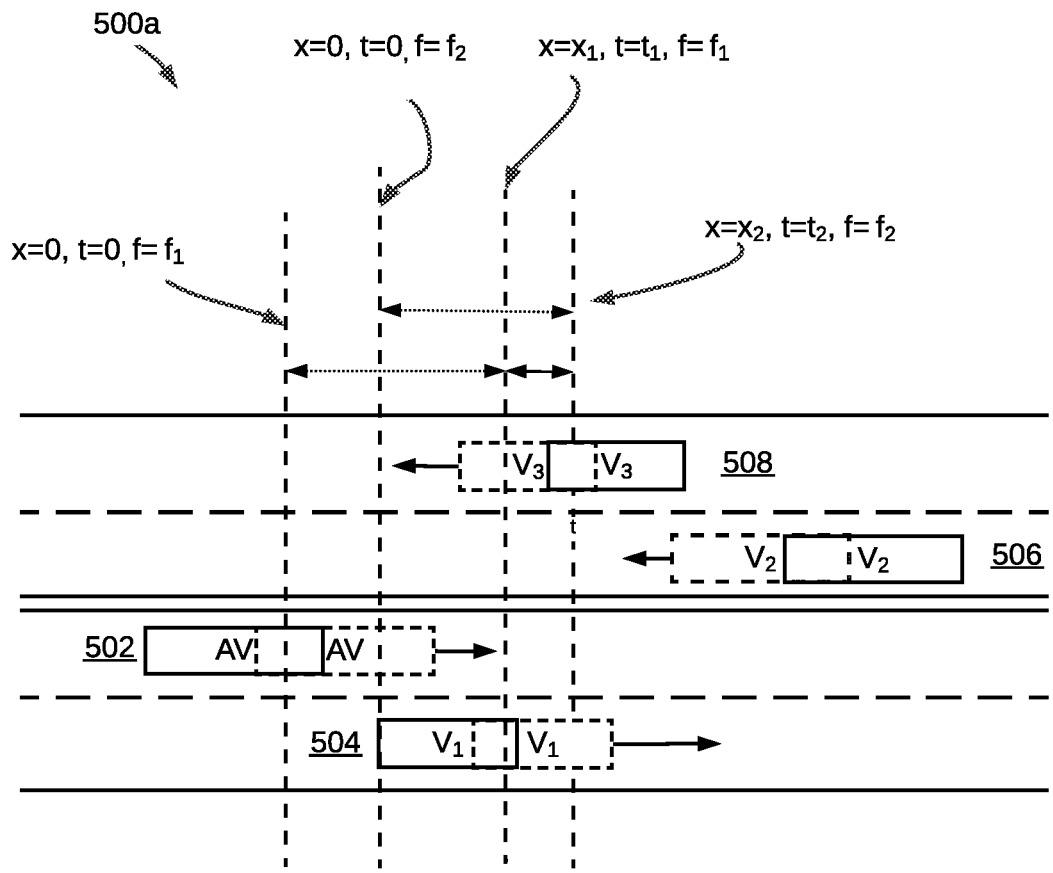
FIG. 5A and FIG. 5B illustrate determination of a set of kinematic parameters by tracking a plurality of neighboring vehicles, in accordance with an exemplary embodiment.
Figure 5B:
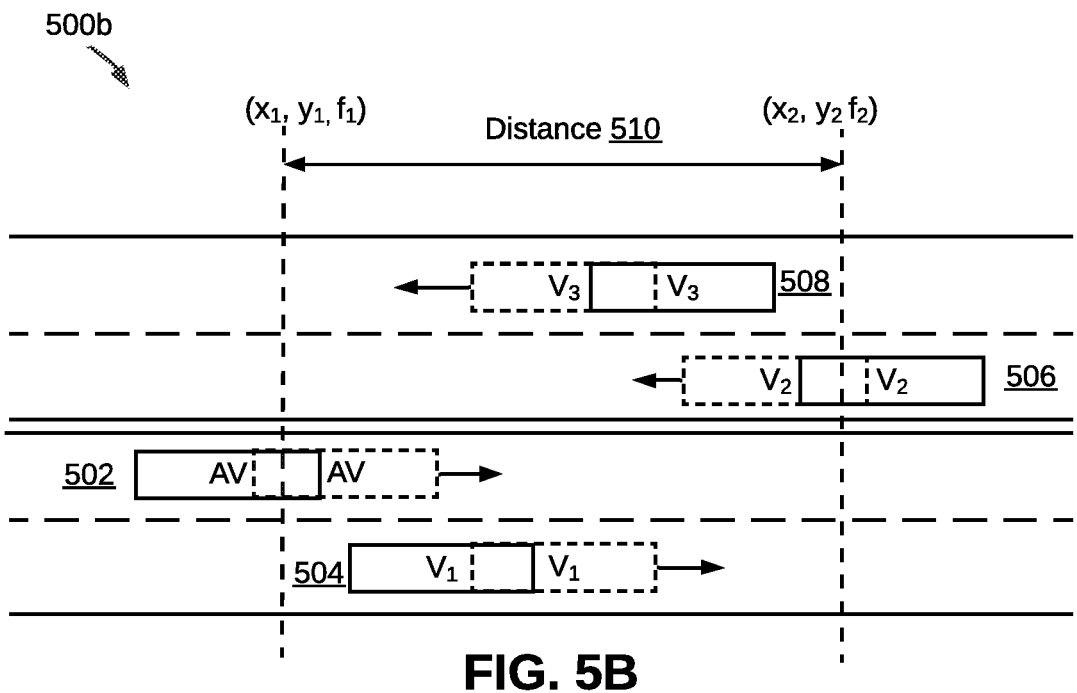

Referring now to FIG. 5A and FIG. 5B, determination of a set of kinematic parameters by tracking a plurality of neighboring vehicles is illustrated, in accordance with an exemplary embodiment. The determination is depicted as views 500a and 500b, each of which may include an AV 502 (analogous to the AV 104) and other neighboring vehicles of the AV 502, i.e., a $V_1$ 504, a $V_2$ 506, and a $V_3$ 508. The view 500a corresponds to frame by frame tracking of each of the $V_1$ 504, the $V_2$ 506, and the $V_3$ 508. While, the view 500b corresponds to determination of distance between the AV 502 and one of the $V_1$ 504, the $V_2$ 506, and the $V_3$ 508.

It may be noted that the $V_1$ 504 and the AV 502 are moving in the same direction. Also, the direction of movement for rest of the neighboring vehicles, i.e., for the $V_2$ 506 and the $V_3$ 508 is the same, however, opposite to direction of movement of the AV 502 and the $V_1$ 504. It is apparent from the FIGS. 5A and 5B, that each of the AV 502, the $V_1$ 504, the $V_2$ 506, and the $V_3$ 508 is moving in a separate lane.

Consider a scenario where the $V_1$ 504 is tracked by the occupancy detection device 202. A reference point (x, t) of the AV 502 is always assumed to be at origin (0,0) in each frame. At time $t=t_1$, frame $f=f_1$, a relative position of the $V_1$ 504 with respect to the AV 502 is $x_1$ and at time $t=t_2$, frame $f=f_2$, the relative position of the $V_1$ 504 with respect to the AV 502 is $x_2$. Now, a difference between the relative positions $x_2$ and $x_1$ calculated that may be referred to as relative distance. It should be noted that orientation of the $V_1$ 504 (extracted from the environment data extraction module 306) and the difference between the relative positions $x_1$ and $x_2$ corresponding to the frames $f_1$ and $f_2$ may be used to determine a direction of the movement of the $V_1$ 504. Similarly, this may be further extended to track the $V_2$ 506, and the $V_3$ 508 in each frame.

A relative distance for all the neighboring vehicles, i.e., the $V_1$ 504, the $V_2$ 506, and the $V_3$ 508, with respect to the AV 502 may be evaluated in each frame, using a Euclidean distance calculation, as per an equation (1), given below:

$$\text{distance} = \sqrt{(x2-x1)^2 + (y2-y1)^2} \quad (1)$$

where, $(x_1, y_1)$ represents the reference point of the AV 502, i.e. (0,0), and $(x_2, y_2)$ represents the reference point of one of the neighboring vehicles, i.e., the $V_1$ 504, the $V_2$ 506, and the $V_3$ 508.

Further, a Euclidean distance 510 between the AV 502 and the $V_2$ 506 at frame f=f1 is depicted in the view 500b of FIG. 5B. The same is extended in each frame and for other neighboring vehicles, i.e., for the $V_1$ 504 and the $V_3$ 508. Once the relative distance of a neighboring vehicle with respect to the AV 502 has been calculates, a relative speed of the neighboring vehicle with respect to the AV 502 may be calculated using equation (2) given below:

$$\text{Relative Speed} = \text{Relative Distance}/\text{Tracking Time} \quad (2)$$

where, the relative distance is the previously calculated distance and tracking time, for example, is the difference between time $t_2$ and time $t_1$.

Figure 6:
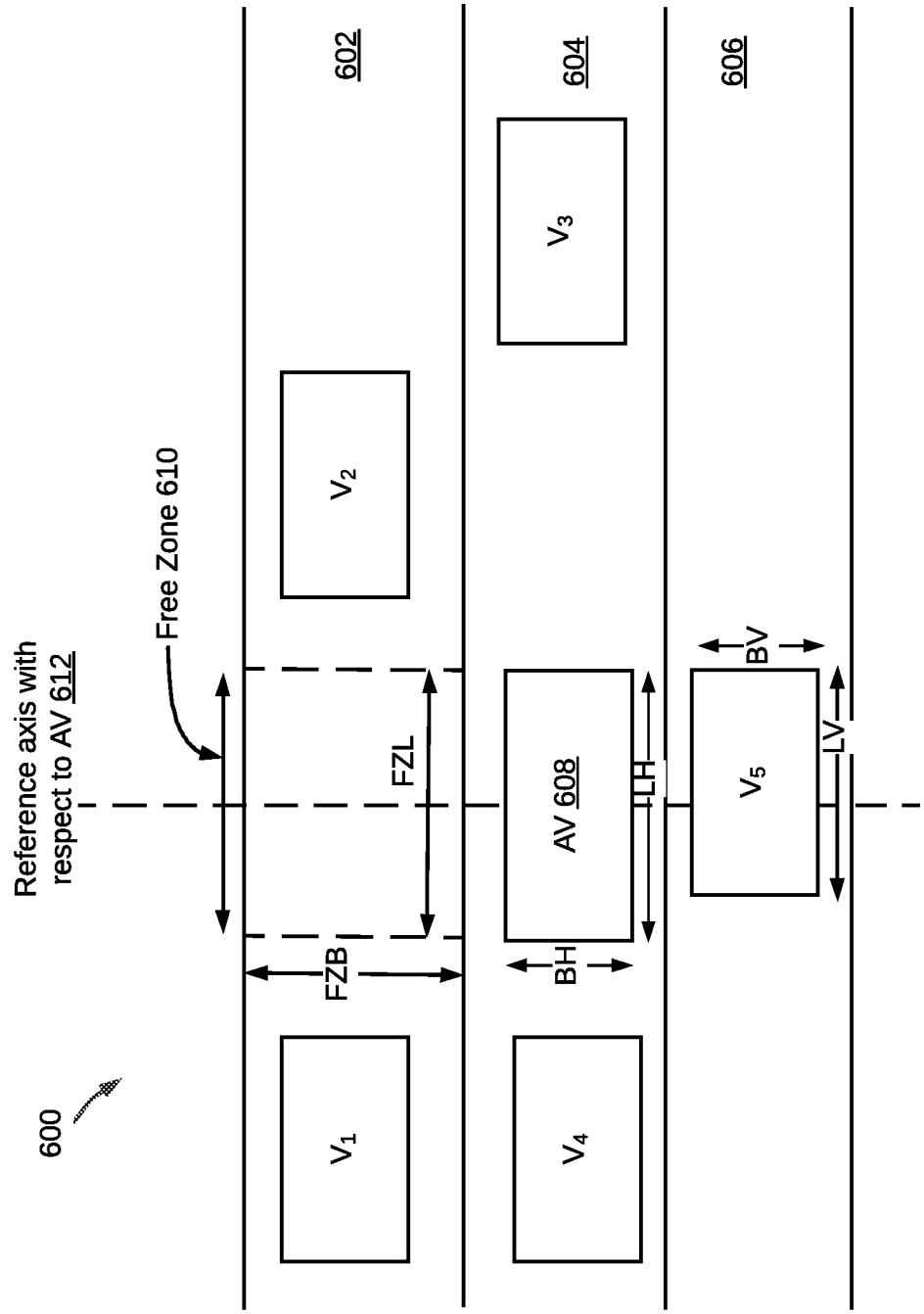
FIG. 6 illustrates determination of effective probability of occupancy for adjacent lanes, in accordance with an exemplary embodiment.

Referring now to FIG. 6, determination of effective probability of occupancy for a plurality of neighboring vehicles is illustrated, in accordance with an exemplary embodiment. A view 600 is depicted, which include a first lane 602, a second lane 604, and a third lane 606. Further, the view 600 includes an AV 608 (analogous to the AV 104 and the AV 502) and a plurality of neighboring vehicles, $V_1$, $V_2$, $V_3$, $V_4$, and $V_5$ (i.e., neighboring vehicles of the AV 608). Initially, an available free space, for example, a free zone 610 with respect to a horizontal reference axis 612 of the AV 608 in the adjacent first lane 602 may be determined. Here, maximum dimensions of the AV 608 are 'LH' (length of the AV 608) and 'BH' (breadth of the AV 608). In order to establish the free zone 610, a condition, i.e., 'FZL'>='LH' and 'FZB'>='BH,' is required to be satisfied for free space availability. In this condition, 'FZL' and 'FZB' may respectively represent length and breadth of the free zone 610. In some embodiments, a volume space occupied by the neighboring vehicles (i.e., $V_1$, $V_2$, $V_3$, $V_4$, and $V_5$) of the AV 608 in a voxel grid map may be calculated using equation (3) given below:

$$\text{Volume space occupied by a vehicle} = LV \times BV \times H \quad (3)$$

where, 'LV', 'BV', and 'HV' (not shown in FIG.) respectively represent length, breadth and height of the neighboring vehicle $V_5$ as detected by the LiDAR sensor 302.

Thereafter, occupancy probability of voxels with respect to each of a plurality of occupancy states may be determined based on equations 4, 5, and 6 given below:

$$\text{Probability of occupied voxels} = W_1 \times (\text{Number of voxels in occupied state}/\text{Total number of voxels}) \quad (4)$$

$$\text{Probability of unoccupied voxels} = W_2 \times (\text{Number of voxels in unoccupied state}/\text{Total number of voxels}) \quad (5)$$

$$\text{Probability of unknown voxels} = W_3 \times (\text{Number of voxels in unknown state}/\text{Total number of voxels}) \quad (6)$$

where, $W_1$, $W_2$ and $W_3$ are weights assigned respectively to occupied state, unoccupied state, an unknown state. Each of the weights $W_1$, $W_2$ and $W_3$ may be selected to establish a dependency between the plurality of occupancy states.

A weight $W_1$ is chosen as the highest weight (for example, $W_1$=0.6), assigning highest priority to the occupied voxels that may be required to determine the lane change feasibility. A weight $W_2$ is chosen to be the least weight (example, $W_2$=0.1), which thereby assigns lowest priority to the unoccupied voxels. Further, a weight $W_3$ is chosen to be the medium weight (for example, $W_3$ is selected to be 0.3 based on the equation (1−(W1+W2)), which thereby assigns medium priority to the unknown state. Values of these weights may be varied according to requirement of a user. Alternatively, value for these weights may be selected based on an analysis and current system configuration.

Thereafter, the calculated probabilities are normalized using the equations 7, 8, 9, and 10 given below:

$$\text{Normalized probability of occupied voxels} = \text{Probability of occupied voxels/Sum of probabilities of all voxels} \quad (7)$$

$$\text{Normalized probability of unoccupied voxels} = \text{Probability of unoccupied voxels/Sum of probabilities of all voxels} \quad (8)$$

$$\text{Normalized probability of unknown voxels} = \text{Probability of unknown voxels/Sum of probabilities of all voxels} \quad (9)$$

$$\text{Sum of probabilities of all voxels} = \text{Probability of occupied voxels} + \text{Probability of unoccupied voxels} + \text{Probability of unknown voxels} \quad (10)$$

Further, to determine the effective probability of occupancy of each of the plurality of the adjacent lanes, an overlap factor is taken into account for each of the plurality of occupancy states. The overlap factor for occupied states may be considered as '1' that may represent hundred percent occupancy of a voxel. Also, the overlap factor for unoccupied states may be considered to be '0' that may represent zero percent occupancy of a voxel. Lastly, the overlap factor for unknown states may be considered as '0.5' that may represent fifty percent occupancy of a voxel.

Now, the effective probability of occupancy for an adjacent lane may be determined based on the equation (11) given below:

$$\text{Effective Probability of Occupancy} = (\text{Normalized Probability of occupied voxels}) \times (\text{overlap factor for occupied states}) + (\text{Normalized Probability of unoccupied voxels}) \times (\text{overlap factor for unoccupied states}) + (\text{Normalized Probability of unknown voxels}) \times (\text{overlap factor for unknown states}) \quad (11)$$

The calculated effective probability of occupancy may be considered as the final probability of occupancy that may be further used to perform a lane change maneuver for the AV 608. A predefined probability threshold may be considered as a hyper parameter that is user configurable. When the effective probability of occupancy is less than or equal to the predefined probability threshold for the adjacent lanes 602 and 608, vehicle control may be established, which will be described in detail in conjunction with FIG. 7. However, when the probability of occupancy is greater than the predefined probability threshold, the lane change maneuver may not be recommended for the AV 608. In this case, the AV 608 may continue to move in the second lane 604, i.e., the current lane of the AV 608.

The predefined probability threshold may be dynamically configurable based on two aspects, i.e., safety and other location scenarios, such as, highway, city roads, muddy roads. By way of an example, for highway scenarios where vehicles move with higher speeds, the predefined probability threshold may be kept higher for safety of vehicles and passengers. By way of another example, for muddy roads, where vehicles' speed is lower, the predefined probability threshold may also be kept lower. Further, the predefined probability threshold may also be selected based on day/night light conditions, such that, the predefined probability threshold may be kept higher for night as compared to daytime.

Figure 7:
FIG. 7 illustrates a table representing lane change feasibility options available to the AV for lane change in various exemplary scenarios, in accordance with an exemplary embodiment.

Referring now to FIG. 7, illustrates a table 700 representing lane change feasibility options available to the AV for lane change to an adjacent lane in various exemplary scenarios, in accordance with an exemplary embodiment. The vehicle control module 314 may receive signals from the policy control module 312, based on which the vehicle control module 314 may control and manage lane change maneuvers for the AV (for example, the AV 104 and the AV 608). In this exemplary embodiment, a signal 'Y' represents that 'Lane change is feasible', a signal 'Y+' represents that 'Lane change is feasible with acceleration', and a signal 'Y−' represents that 'Lane change is feasible with deceleration.'

In one scenario, the current speed of the AV is equal to the speed of other vehicles (neighboring vehicles) present in the adjacent lane. In this scenario, when the other vehicle is present in front of the AV in the adjacent lane, the signal 'Y' may be transmitted by the policy control module 312. This may represent that a lane change to the adjacent lane is feasible for the AV while maintaining the current speed. Further, when the other vehicle is present behind the AV in the adjacent lane and moving with the same speed, the signal 'Y' may be transmitted by the policy control module 312. However, when the other vehicle is present just beside the AV, the signal 'Y+' or 'Y−' may be transmitted by the policy control module 312. In this case, lane change may not be feasible while maintaining the current speed, and thus the AV may have to accelerate or deaccelerate based on free space available in the current lane.

In another scenario, the speed of the AV may be greater than speed of the other vehicle. In this scenario, when the other vehicle is present in front of the AV in the adjacent lane, the signal 'Y−' may be transmitted by the policy control module 312. This may indicate that lane change to the adjacent lane is not feasible for the AV while maintaining the current speed and the AV may have to deaccelerate. Further, when the other vehicle is present behind the AV in adjacent lane, the signal 'Y' may be transmitted by the policy control module 312. Now, when the other vehicle is present just beside the AV, the signal 'Y+' or 'Y−' may be transmitted by the policy control module 312.

Yet, in another scenario, when the current speed of the AV is less than speed of the other vehicle and the other vehicle is present in front of the AV in the adjacent lane. The signal 'Y' may be transmitted by the policy control module 312, which may represent that lane change is feasible for the AV while maintaining the current speed. Further, when the other vehicle is present behind the AV in the adjacent lane, the signal 'Y+' may be transmitted by the policy control module 312. However, when the other vehicle is present just beside the AV, the signal 'Y+' or 'Y−' may be transmitted by the policy control module 312.

It should be noted, the lane change feasibility will be detected for both sides of the AV. The policy control module 312 may provide recommendation signals given as 'Y', 'Y+', 'Y−'. When the signal 'Y' is generated for the adjacent lane (i.e. lane change to the adjacent lane is feasible without speed change), the adjacent lane may be given highest priority and may be chosen for lane change. In other words, the signal 'Y' is assigned the highest priority. In case, the signals 'Y+' and 'Y−' both generated for the adjacent lane, then based on the current speed of the AV, difference between the change in speed required for both the scenarios may be considered to change the lane. The smallest of change is speed corresponding to the signals 'Y+' or 'Y−' may be selected, keeping safety of the AV and passengers in view. It may be note that each of the signals 'Y,' 'Y+,' and 'Y−' may be one of a plurality of feasibility categories.

Figure 8:
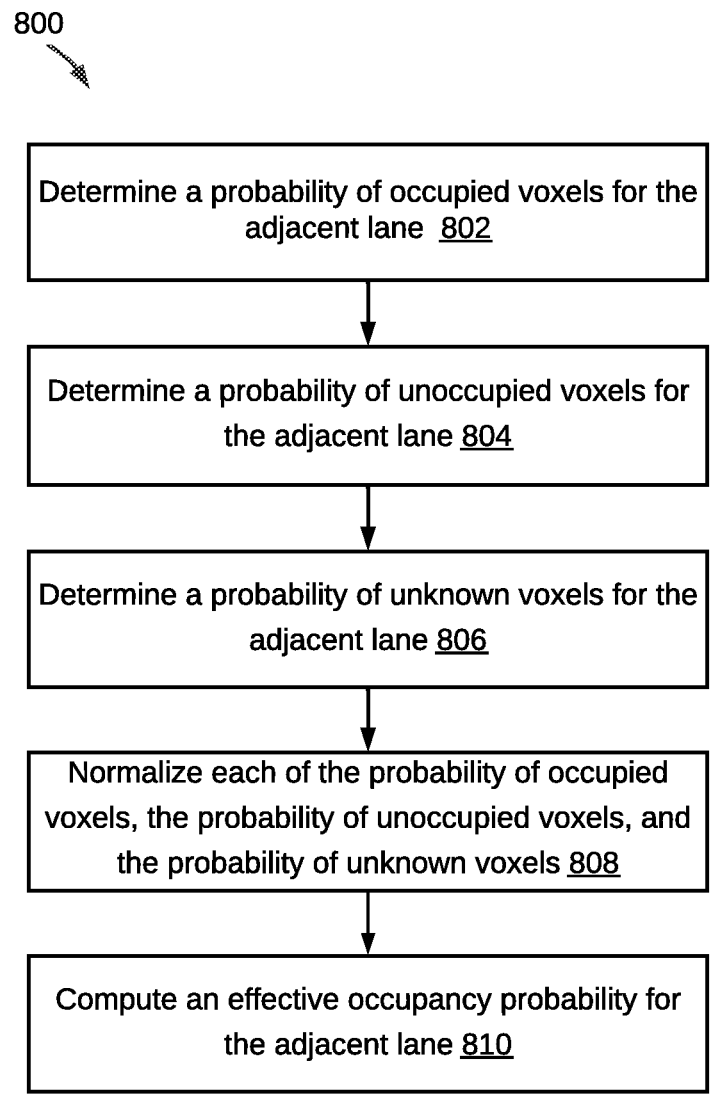
FIG. 8 illustrates a flowchart of a method for determining an effective occupancy probability, in accordance with an embodiment.

Referring now to FIG. 8, a flowchart 800 of a method for determining an effective occupancy probability of an adjacent lane is illustrated, in accordance with an embodiment. At step 802, a probability of occupied voxels for the adjacent lane may be determined. In some embodiments, determination of the probability of occupied voxels may be executed based on a weight assigned to the occupied state. Additionally, in some embodiments, determination of the probability of occupied voxels may be performed based on a number of voxels assigned to the occupied state in a set of voxels associated with the adjacent lane. This has already been explained in detail in conjunction with FIG. 6.

At step 804, a probability of unoccupied voxels may be determined for the adjacent lane. It should be noted that the probability of unoccupied voxels may be determined based on a weight assigned to the unoccupied state and a number of voxels assigned the unoccupied state in the set of voxels. At step 806, a probability of unknown voxels may be determined for the adjacent lane. It should be noted that a weight assigned to the unknown state and a number of voxels assigned the unknown state in the set of voxels may be used to determine the probability of unknown voxels. This has already been explained in detail in conjunction with FIG. 6.

At step 808, normalized probability corresponding to each of the probability of occupied voxels, the probability of unoccupied voxels, and the probability of unknown voxels may be calculated. To calculate the normalized probability for occupied, unoccupied and unknown voxels, a summation of probability may be determined for each voxel in the set of voxels. This has already been explained in detail in conjunction with FIG. 6. At step 810, an effective occupancy probability may be computed for the adjacent lane. The plurality of overlap factors may be considered and each of the normalized probability of occupied voxels, the normalized probability of unoccupied voxels, and the normalized probability of unknown voxels may be used to compute the effective occupancy probability. This has already been explained in detail in conjunction with FIG. 6.

Figure 9:
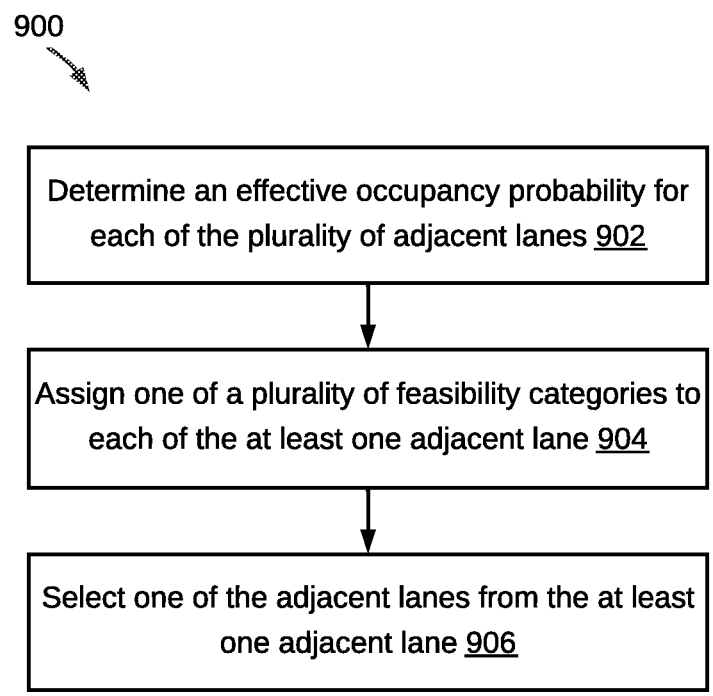
FIG. 9 illustrates a flowchart of a method for selecting an adjacent lane for an AV to perform lane change maneuvers, in accordance with an embodiment.

Referring now to FIG. 9, a flowchart 900 of a method for selecting an adjacent lane for the AV to perform lane change maneuvers is illustrated, in accordance with an embodiment. At step 902, an effective occupancy probability for each of the plurality of adjacent lanes is determined. Further, at step 904, one of a plurality of feasibility categories may be assigned to each of the at least one adjacent lane. A current speed of the AV, current speed of the at least one neighboring vehicle, and location of the at least one neighboring vehicle may be monitored to assign a feasibility category. It should be noted that the plurality of feasibility categories may include lane change while maintaining speed of the AV, lane change while increasing speed of the AV, and lane change while decreasing speed of the AV. This has already been explained in detail in conjunction with FIG. 7.

At step 904, one of the adjacent lanes from the at least one adjacent lane may be selected based on priority assigned to each of the plurality of feasibility categories. It should be noted that priority is assigned to each of the plurality of feasibility categories based on a current location of the. This has already been explained in detail in conjunction with FIG. 7.

Further, it should also be noted that, when output of the policy control module 312 permits to change the lane, then a track to change the lane may be planned according to a least cost path. Each voxel with an assigned state has a cost according to the occupancy. The occupied state is associated with the highest cost, the unknown state may be associated with a cost lesser than the cost of occupied state and the unoccupied state may be associated with the least cost. These costs may be used for determining track for lane change by existing path planning algorithms. The calculated track information may be sent to the vehicle control module 314. This has already been explained in detail in conjunction with FIG. 7.

Figure 10:
FIG. 10 illustrates a table that includes different control policies of an AV for occupied, unoccupied and unknown states of adjacent lanes, in accordance with an exemplary embodiment.

Referring now to FIG. 10, illustrates a table 1000 that includes different control policies of an AV for occupied, unoccupied and unknown states of adjacent lanes, in accordance with an exemplary. By way of an example in the table 1000, a total of '1000' number of voxels are considered. In this example, occupied state is assigned to '100' voxels, unoccupied state is assigned to '700' voxels, and unknown state is assigned to '200' voxels. Weights corresponding to occupied, unoccupied, and unknown states are '0.6', '0.1' and, '0.3', respectively. Now, probability of occupied, unoccupied and unknown voxels may be calculated using equations (4), (5), and (6). The probability of occupied voxels may be 0.06 (i.e. (0.6×(100/1000)=0.06), the probability of unoccupied voxels may be 0.07 (say, 0.1×(700/1000)=0.07), and the probability of unknown voxels is 0.06 (i.e. 0.3× (200/1000)=0.06). The normalized probability of occupied voxels is 0.31, may be calculated using the equation (7), i.e. (0.06)/(0.06+0.07+0.06)=0.31. Similarly, using equations (8) and (9) normalized probability of unoccupied and unknown voxels may be calculated. The obtained normalized probabilities of unoccupied and unknown voxels are 0.37 and 0.31, respectively. To calculate the effective probability of occupancy, the equation (10) may be used, i.e.

$$\text{Effective Probability of Occupancy} = (0.31) \times 1 + (0.37) \times (0) + (0.31) \times (0.5) = 0.465$$

In this example, a predefined probability threshold is taken as '0.5'. So in this case, the vehicle control policy may be established for lane change, as the determined effective probability of occupancy is less than the threshold. Other use cases mentioned in the table 10 are calculated in a same way as calculated in this example by considering the threshold of 0.5

The present disclosure may overcome drawbacks of the conventional systems and methods by providing faster realtime performance. In addition, the described system and method requires less computations, as the point-cloud data is used that may result in dimensionality reduction. Further, the present system is capable of handling complex scenarios such as rogue vehicle behavior, curvy roads, muddy roads, unknown state handling, unknown obstacle handling, and day/nighttime conditions.

Figure 11:
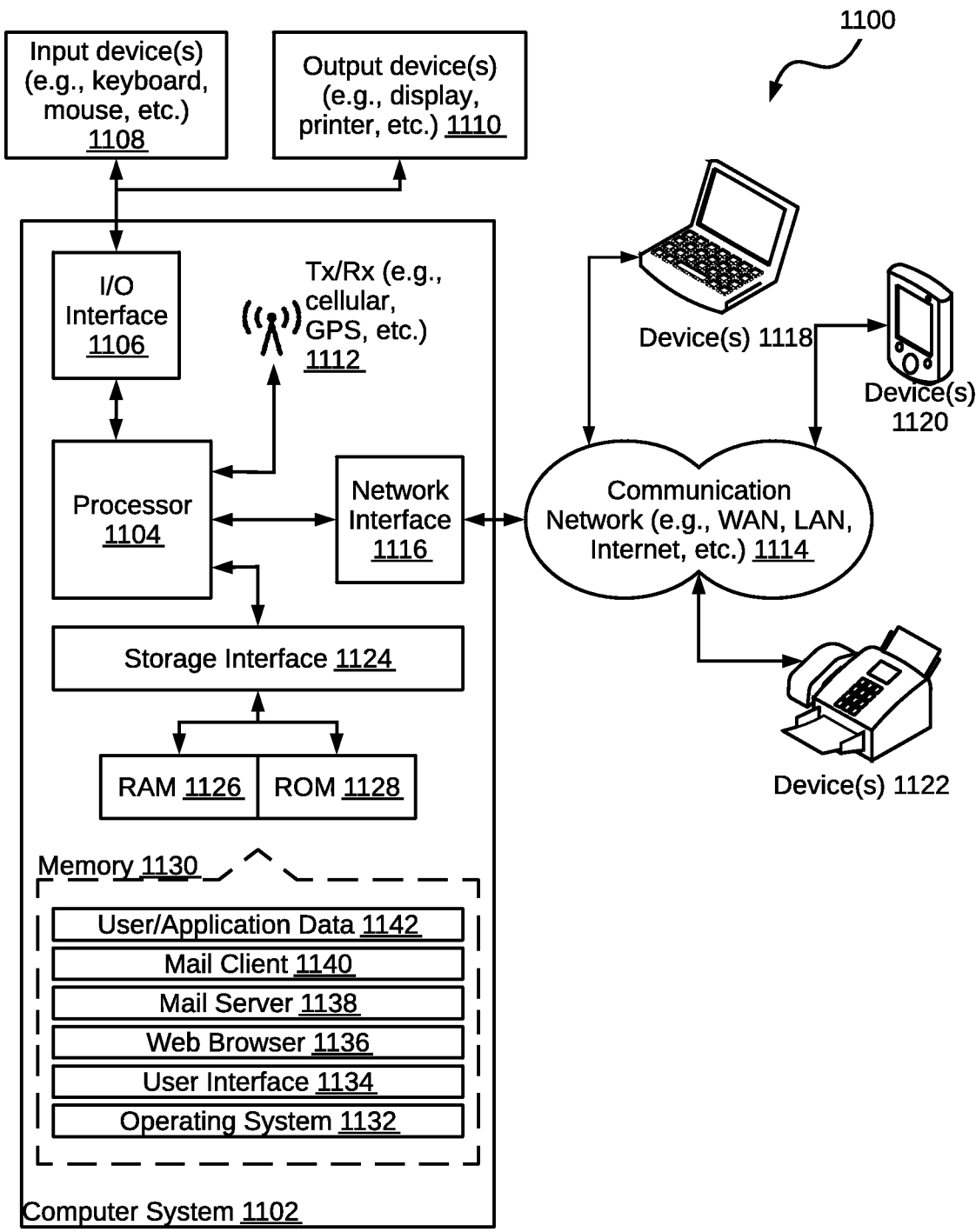
FIG. 11 illustrates a block diagram of an exemplary computer system for implementing embodiments consistent with the present disclosure.

Referring now to FIG. 11, a block diagram of an exemplary computer system 1102 for implementing various embodiments is illustrated. Computer system 1102 may include a central processing unit ("CPU" or "processor") 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for determining lane change feasibility for an Autonomous Vehicle (AV). The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining lane change feasibility for an Autonomous Vehicle (AV), the method comprising:
    tracking in a plurality of frames, by an occupancy detection device, at least one neighboring vehicle from a plurality of neighboring vehicles in a current lane being used by the AV and in a plurality of adjacent lanes based on a neural network, wherein the AV is considered as a reference point to track the at least one neighboring vehicle;
    determining in each frame, by the occupancy detection device, a set of kinematic parameters associated with each of the at least one neighboring vehicle, based on information captured in response to the tracking;
    assigning, by the occupancy detection device, an occupancy state from a plurality of occupancy states to each of a plurality of voxels capturing a spatial information for each of the plurality of neighboring vehicles moving on one of the plurality of adjacent lanes and the current lane, based on the spatial information and dimensions of the AV;
    determining, by the occupancy detection device, an effective occupancy probability for each of the plurality of adjacent lanes, based on an occupancy state assigned to each voxel in an associated set of voxels from the plurality of voxels, weights associated with each of the plurality of occupancy states, and a plurality of overlap factors; and
    determining, by the occupancy detection device, feasibility of lane change for the AV to at least one adjacent lane from the plurality of adjacent lanes based on comparison of the effective occupancy probability determined for each of the plurality of adjacent lanes with a predefined probability threshold,
    wherein determining the effective occupancy probability for an adjacent lane from the plurality of adjacent lanes comprises:
        determining a probability of occupied voxels for the adjacent lane, based on a weight assigned to an occupied state and a number of voxels assigned to the occupied state in a set of voxels from the plurality of voxels associated with the adjacent lane;
        determining a probability of unoccupied voxels for the adjacent lane, based on a weight assigned to an unoccupied state and a number of voxels assigned the unoccupied state in the set of voxels; and determining a probability of unknown voxels for the adjacent lane, based on a weight assigned to an unknown state and a number of voxels assigned the unknown state in the set of voxels.

2. The method of claim 1, wherein the set of kinematic parameters for each of the at least one neighboring vehicle comprises a relative speed with respect to the AV, a relative position with respect to the AV, a relative distance with respect to the AV, and a relative direction of motion with respect to the AV.

3. The method of claim 1, wherein the plurality of occupancy states comprises occupied state, the unoccupied state, and the unknown state, and wherein highest weight is associated with the occupied state and lowest weight is associated with the unoccupied state.

4. The method of claim 1, further comprising:
normalizing each of the probability of occupied voxels, the probability of unoccupied voxels, and the probability of unknown voxels based on a summation of probability determined for each voxel in the set of voxels to generate a normalized probability of occupied voxels, a normalized probability of unoccupied voxels, and a normalized probability of unknown voxels; and
computing an effective occupancy probability for the adjacent lane based on the plurality of overlap factors and each of the normalized probability of occupied voxels, the normalized probability of unoccupied voxels, and the normalized probability of unknown voxels.

5. The method of claim 1, wherein the effective occupancy probability determined for each of the at least one adjacent lane is greater than the predefined probability threshold.

6. The method of claim 5, further comprising assigning one of a plurality of feasibility categories to each of the at least one adjacent lane based on a current speed of the AV, current speed of the at least one neighboring vehicle, and location of the at least one neighboring vehicle, wherein the plurality of feasibility categories comprises lane change while maintaining speed of the AV, lane change while increasing speed of the AV, and lane change while decreasing speed of the AV.

7. The method of claim 6, further comprising selecting one of the adjacent lanes from the at least one adjacent lane based on priority assigned to each of the plurality of feasibility categories, wherein priority is assigned to each of the plurality of feasibility categories based on a current location of the AV.

8. The method of claim 1, further comprising:
receiving a point cloud data comprising an environmental information of a plurality of objects in proximity of the AV using a Light Detection and Ranging (LIDAR) sensor, wherein the plurality of objects comprise the plurality of neighboring vehicles, and wherein each frame is derived from the point cloud; and
deriving the plurality of voxels from the point cloud data.

9. The method of claim 1, wherein tracking the at least one neighboring vehicle comprises fetching localization information associated with each of the at least one neighboring vehicle, wherein the localization information of a neighboring vehicle comprises a vehicle speed, direction of motion of a vehicle, and a vehicle position.

10. A system for determining lane change feasibility for an Autonomous Vehicle (AV), the system comprising:
a processor; and
a memory communicatively coupled to the processor, wherein the memory stores processor instructions, which, on execution, causes the processor to:
track at least one neighboring vehicle from a plurality of neighboring vehicles in a current lane being used by the AV and in a plurality of adjacent lanes, in a plurality of frames, based on a neural network, wherein the AV is considered as a reference point to track the at least one neighboring vehicle;
determine in each frame a set of kinematic parameters associated with each of the at least one neighboring vehicle, based on information captured in response to the tracking;
assign an occupancy state from a plurality of occupancy states to each of a plurality of voxels capturing a spatial information for each of the plurality of neighboring vehicles moving on one of the plurality of adjacent lanes and the current lane, based on the spatial information and dimensions of the AV;
determine an effective occupancy probability for each of the plurality of adjacent lanes, based on an occupancy state assigned to each voxel in an associated set of voxels from the plurality of voxels, weights associated with each of the plurality of occupancy states, and a plurality of overlap factors; and
determine feasibility of lane change for the AV to at least one adjacent lane from the plurality of adjacent lanes based on comparison of the effective occupancy probability determined for each of the plurality of adjacent lanes with a predefined probability threshold,
wherein the processor instructions further cause the processor to determine the effective occupancy probability for an adjacent lane from the plurality of adjacent lanes by:
determining a probability of occupied voxels for the adjacent lane, based on a weight assigned to an occupied state and a number of voxels assigned the occupied state in a set of voxels from the plurality of voxels associated with the adjacent lane;
determining a probability of unoccupied voxels for the adjacent lane, based on a weight assigned to an unoccupied state and a number of voxels assigned the unoccupied state in the set of voxels; and
determining a probability of unknown voxels for the adjacent lane, based on a weight assigned to an unknown state and a number of voxels assigned the unknown state in the set of voxels.

11. The system of claim 10, wherein the set of kinematic parameters for each of the at least one neighboring vehicle comprises a relative speed with respect to the AV, a relative position with respect to the AV, a relative distance with respect to the AV, and a relative direction of motion with respect to the AV.

12. The system of claim 10, wherein the plurality of occupancy states comprises the occupied state, the unoccupied state, and the unknown state, and wherein highest weight is associated with the occupied state and lowest weight is associated with the unoccupied state.

13. The system of claim 10, wherein the processor instructions further cause the processor to:
normalize each of the probability of occupied voxels, the probability of unoccupied voxels, and the probability of unknown voxels based on a summation of probability determined for each voxel in the set of voxels to generate a normalized probability of occupied voxels, a normalized probability of unoccupied voxels, and a normalized probability of unknown voxels; and compute an effective occupancy probability for the adjacent lane based on the plurality of overlap factors and each of the normalized probability of occupied voxels, the normalized probability of unoccupied voxels, and the normalized probability of unknown voxels, wherein the effective occupancy probability determined for each of the at least one adjacent lane is greater than the predefined probability threshold.

14. The system of claim 13, wherein the processor instructions further cause the processor to assign one of a plurality of feasibility categories to each of the at least one adjacent lane based on a current speed of the AV, current speed of the at least one neighboring vehicle, and location of the at least one neighboring vehicle, wherein the plurality of feasibility categories comprises lane change while maintaining speed of the AV, lane change while increasing speed of the AV, and lane change while decreasing speed of the AV.

15. The system of claim 14, wherein the processor instructions further cause the processor to select one of the adjacent lanes from the at least one adjacent lane based on priority assigned to each of the plurality of feasibility categories, wherein priority is assigned to each of the plurality of feasibility categories based on a current location of the AV.

16. The system of claim 10, wherein the processor instructions further cause the processor to:
receive a point cloud data comprising an environmental information of a plurality of objects in proximity of the AV using a Light Detection and Ranging (LIDAR) sensor, wherein the plurality of objects comprise the plurality of neighboring vehicles, and wherein each frame is derived from the point cloud; and
derive the plurality of voxels from the point cloud data.

17. The system of claim 10, wherein the processor instructions further cause the processor to track the at least one neighboring vehicle by fetching localization information associated with each of the at least one neighboring vehicle, wherein the localization information of a neighboring vehicle comprises a vehicle speed, direction of motion of a vehicle, and a vehicle position.

18. A non-transitory computer-readable medium for determining lane change feasibility for an Autonomous Vehicle (AV), having stored thereon, a set of computer-executable instructions causing a computer comprising one or more processors to perform steps comprising:

tracking in a plurality of frames at least one neighboring vehicle from a plurality of neighboring vehicles in a current lane being used by the AV and in a plurality of adjacent lanes based on a neural network, wherein the AV is considered as a reference point to track the at least one neighboring vehicle;

determining in each frame a set of kinematic parameters associated with each of the at least one neighboring vehicle, based on information captured in response to the tracking;

assigning an occupancy state from a plurality of occupancy states to each of a plurality of voxels capturing a spatial information for each of the plurality of neighboring vehicles moving on one of the plurality of adjacent lanes and the current lane, based on the spatial information and dimensions of the AV;

determining an effective occupancy probability for each of the plurality of adjacent lanes, based on an occupancy state assigned to each voxel in an associated set of voxels from the plurality of voxels, weights associated with each of the plurality of occupancy states, and a plurality of overlap factors; and determining of lane change for the AV to at least one adjacent lane from the plurality of adjacent lanes based on comparison of the effective occupancy probability determined for each of the plurality of adjacent lanes with a predefined probability threshold, wherein determining the effective occupancy probability for an adjacent lane from the plurality of adjacent lanes comprises:
determining a probability of occupied voxels for the adjacent lane, based on a weight assigned to an occupied state and a number of voxels assigned to the occupied state in a set of voxels from the plurality of voxels associated with the adjacent lane;
determining a probability of unoccupied voxels for the adjacent lane, based on a weight assigned to an unoccupied state and a number of voxels assigned the unoccupied state in the set of voxels; and
determining a probability of unknown voxels for the adjacent lane, based on a weight assigned to an unknown state and a number of voxels assigned the unknown state in the set of voxels.

* * * * *